United States Patent
Ger et al.

(10) Patent No.: US 7,579,789 B2
(45) Date of Patent: Aug. 25, 2009

(54) DEVICE FOR DRIVING LIGHT SOURCES

(75) Inventors: Chih-Chan Ger, Taipei Hsien (TW); Yi-Cheng Liu, Taipei Hsien (TW); Chen-An Chiang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 285 days.

(21) Appl. No.: 11/617,767

(22) Filed: Dec. 29, 2006

(65) Prior Publication Data
US 2008/0080216 A1 Apr. 3, 2008

(30) Foreign Application Priority Data
Sep. 29, 2006 (CN) .................. 2006 1 0062887

(51) Int. Cl.
*H05B 37/02* (2006.01)
(52) U.S. Cl. ........................ 315/307; 363/16
(58) Field of Classification Search ............... 315/86, 315/101, 177, 224, 246, 247, 282, 291, 307; 363/21.1, 21.05, 20, 25, 71, 124, 127, 133; 323/211, 224, 235, 266, 269, 263
See application file for complete search history.

(56) References Cited

U.S. PATENT DOCUMENTS

| 4,864,482 A * | 9/1989 | Quazi et al. ................... 363/37 |
| 6,570,344 B2 * | 5/2003 | Lin ............................. 315/224 |

FOREIGN PATENT DOCUMENTS

CN 1433131 7/2003

* cited by examiner

*Primary Examiner*—Rajnikant B Patel
(74) *Attorney, Agent, or Firm*—Wei Te Chung

(57) ABSTRACT

A driving device for driving a lamp (L) includes a power stage circuit (21), a transformer circuit (22), a voltage dividing circuit (23), an inrush current sensing circuit (24), and a controller circuit (26). The power stage circuit converts a received direct current (DC) signal to an alternating current (AC) signal. The transformer circuit is connected to the power stage circuit, for converting the AC signal to an appropriate signal to drive the lamp. The voltage dividing circuit is connected to the transformer circuit, for dividing voltage of the signal output from the transformer circuit. The inrush current sensing circuit is connected to the voltage dividing circuit, for sensing inrush current output from the transformer circuit. The controller circuit is connected to the power stage circuit, for controlling output of the power stage circuit according to output of the inrush current sensing circuit.

20 Claims, 4 Drawing Sheets

DEVICE FOR DRIVING LIGHT SOURCES

BACKGROUND OF THE INVENTION

1. Field of the Invention

The invention relates to devices for driving light sources, and particularly to a driving device for avoiding a arcing.

2. Description of Related Art

Conventionally, a liquid crystal display (LCD) panel uses discharge lamps, such as cold cathode fluorescent lamps (CCFLs), as light sources of a backlight system. Typically, an inverter circuit, which includes a transformer for stepping up an alternating current (AC) signal, is used to drive the CCFLs. In order to reduce the size of electronic devices, a secondary winding of the transformer is constructed to be very thin, which makes it susceptible to being damaged and can lead to arcing, presenting an unacceptable risk.

Referring to FIG. 4, a block diagram of a conventional driving device for driving a lamp L' is shown. The conventional driving device includes a power stage circuit 11, a transformer T', a voltage sensing resistor R1, a compare and latch circuit 12, a controller circuit 13, a protection circuit 14 and two capacitors C11, C12. A primary winding of the transformer T' is connected to the power stage circuit 11. A high terminal of a secondary winding of the transformer T' is connected to the lamp L', and a low terminal of the secondary winding of the transformer T' receives a DC signal Vin. One end of the voltage sensing resistor R1 is connected to the high terminal of the transformer T', and the compare and latch circuit 12 is connected between the other end of the voltage sensing resistor R1 and the controller circuit 13.

When there is no arcing on the secondary winding of the transformer T', both of the AC signal stepped by the transformer T' and a DC level of the DC signal Vin can be sensed by the voltage sensing resistor R1. However, when there is a arcing on the secondary winding of the transformer T', only the AC signal stepped by the transformer T' can be sensed by the voltage sensing resistor R1. Therefore, the conventional driving device only determines whether there is arcing on the secondary winding of the transformer T' according to the DC level of the DC signal Vin.

Therefore, when the device drives a plurality of lamps, there is need for a plurality of voltage sensing resistors and compare and latch circuits, which increases the cost and complexity of circuit construction of the device, and also requires that the device be larger to accommodate the complex circuitry.

SUMMARY OF THE INVENTION

An exemplary embodiment of the invention provides a driving device for driving a lamp, which includes a power stage circuit, a transformer circuit, a voltage dividing circuit, an inrush current sensing circuit, and a controller circuit. The power stage circuit converts a received direct current (DC) signal to an alternating current (AC) signal. The transformer circuit is connected to the power stage circuit, for converting the AC signal to an appropriate signal to drive the lamp. The voltage dividing circuit is connected to the transformer circuit, for dividing voltage of the signal output from the transformer circuit. The inrush current sensing circuit is connected to the voltage dividing circuit, for sensing inrush current output from the transformer circuit. The controller circuit is connected to the power stage circuit, for controlling output of the power stage circuit according to output of the inrush current sensing circuit.

Another exemplary embodiment of the invention provides a driving device for driving a plurality of lamps, which includes a power stage circuit, a plurality of transformers and voltage dividing circuits, an inrush current sensing circuit, and a controller circuit. The power stage circuit converts a received direct current (DC) signal to an alternating current (AC) signal. Each of the transformers includes at least one primary winding and secondary winding. The primary windings are connected to the power stage circuit, and high terminals of the secondary windings are respectively connected one of the plurality of lamps, for converting the AC signal to appropriate signals to drive the lamps. The voltage dividing circuits are connected to the high terminal of the secondary winding of the corresponding transformer, for dividing voltage of the signal output from the transformers. The inrush current sensing circuit is connected to the voltage dividing circuits, for sensing inrush current output from the transformer circuits. The controller circuit is connected to the power stage circuit, for controlling output of the power stage circuit according to output of the inrush current sensing circuit.

Other advantages and novel features will become more apparent from the following detailed description of preferred embodiments when taken in conjunction with the accompanying drawings, in which:

DETAILED DESCRIPTION OF THE INVENTION

Figure 1:
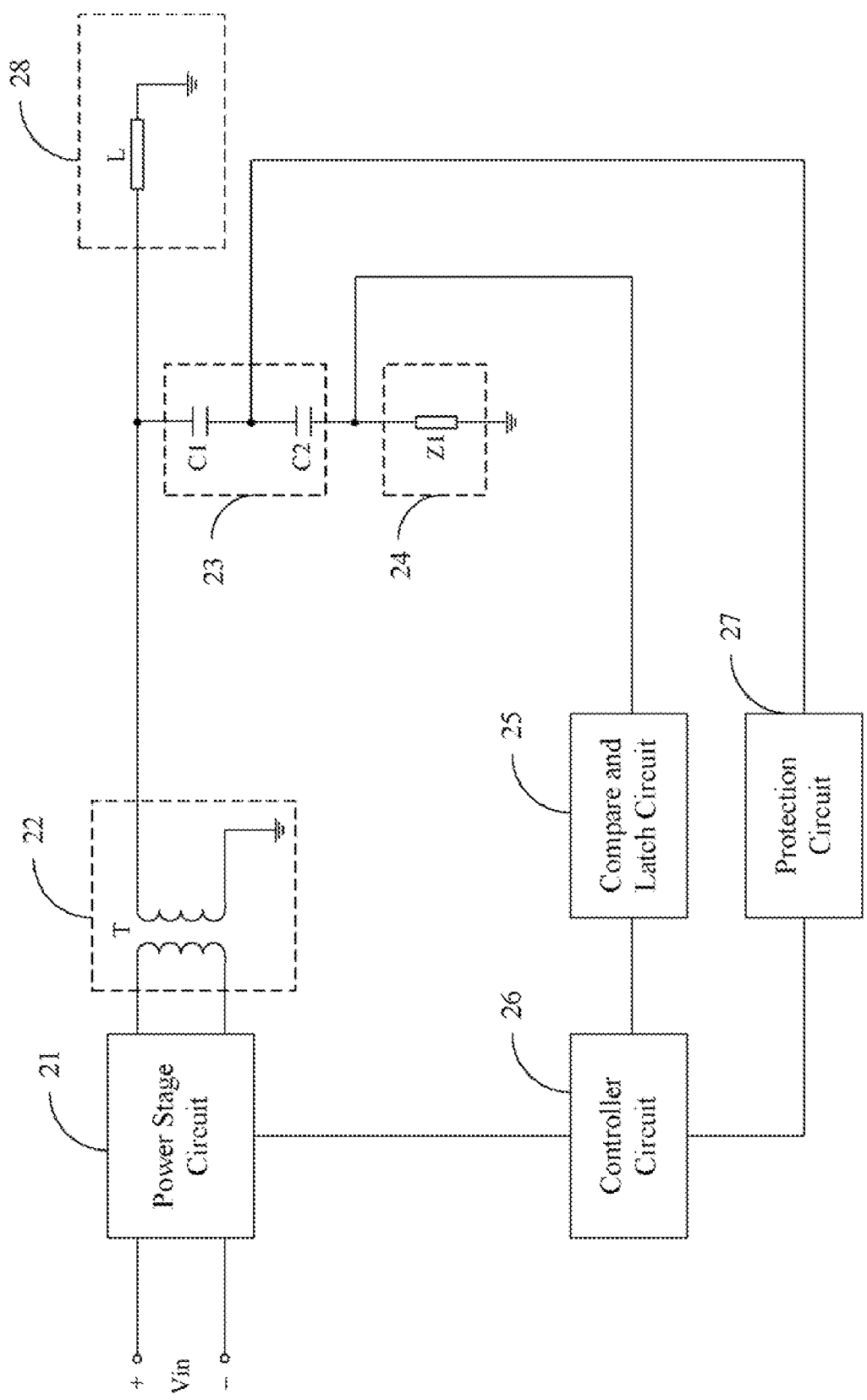
FIG. 1 is a block diagram of a driving device of an exemplary embodiment of the present invention.

FIG. 1 is a block diagram of a driving device of an exemplary embodiment of the present invention. The driving device for driving a light source module 28 includes a power stage circuit 21, a transformer circuit 22, a voltage dividing circuit 23, an inrush current sensing circuit 24, a compare and latch circuit 25, a controller circuit 26, and a protection circuit 27. In the exemplary embodiment, the light source module 28 includes one lamp L.

The power stage circuit 21 converts a received direct current (DC) signal Vin to an alternating current (AC) signal. In the exemplary embodiment, the AC signal output from the power stage circuit 21 is a square-wave signal.

The transformer circuit 22 is connected between the power stage circuit 21 and the light source module 28, for converting the AC signal output from the power stage circuit 21 to another AC signal to drive the lamp L. In the exemplary embodiment, the AC signal output from the transformer circuit 22 is a sine-wave signal. The transformer circuit 22 includes a transformer T that includes a primary winding and a secondary winding. The primary winding of the transformer T is connected to the power stage circuit 22. A high terminal of the secondary winding of the transformer T is connected to the lamp L, and a low terminal of the secondary winding of the transformer T is grounded.

The voltage dividing circuit 23 is connected to the transformer circuit 22, for dividing a voltage of the AC signal output from the transformer circuit 22. The voltage dividing circuit 23 includes two voltage dividing components C1 and C2, which are connected in series. In the exemplary embodiment, the voltage dividing components C1 and C2 are capacitors. One end of the capacitor C1 is connected to the high terminal of the secondary winding of the transformer T, and the other end of the capacitor C1 is connected to one end of the capacitor C2.

The inrush current sensing circuit 24 is connected to the voltage dividing circuit 23, for sensing inrush current output from the transformer circuit 22 when there is arcing on the secondary winding of the transformer T. In the exemplary embodiment, the inrush current sensing circuit 24 includes an impedance component Z1 that is connected between the other end of the capacitor C2 and ground.

In the exemplary embodiment, the impedance component Z1 includes a resistor, an inductor, a series circuit including a resistor and an inductor, or a parallel circuit including a resistor and an inductor.

The controller circuit 26 is connected to the power stage circuit 21, for controlling output of the power stage circuit 21 according to the output of the inrush current sensing circuit 24. In the exemplary embodiment, the controller circuit 26 includes a pulse-width modulation (PWM) controller. The compare and latch circuit 25 is connected between the inrush current sensing circuit 24 and the controller circuit 26, for outputting a latch signal according to the sensed inrush current to control the output of the power stage circuit 21.

In the exemplary embodiment, the inrush current is generated when there is arcing on the secondary winding of the transformer T. The inrush current flows through the impedance component Z1 via the capacitors C1 and C2, which put a higher voltage on the impedance component Z1. The higher voltage across the impedance component Z1 is greater than a trigger voltage of the compare and latch circuit 25, thus, the compare and latch circuit 25 outputs a latch signal, such as: a logic low level 0, to the controller circuit 26 to shut off output of the power stage circuit 21.

When there is no arcing on the secondary winding of the transformer T, inrush current is not generated. Thus, a voltage sensed by the impedance component Z1 is lower than the trigger voltage of the compare and latch circuit 25. Then, the compare and latch circuit 25 outputs a latch signal, such as: a logic high level 1, to the controller circuit 26 to maintain output of the power stage circuit 21.

In alternative embodiments, the compare and latch circuit 25 can output a logic high level 1 to the controller circuit 26, when there is arcing on the secondary winding of the transformer T; similarly, the compare and latch circuit 25 can output a logic low level 0 to the controller circuit 26, when there is no arcing on the secondary winding of the transformer T.

In the exemplary embodiment, the driving device further includes a protection circuit 27 that is connected between the voltage dividing circuit 23 and controller circuit 26. That is, the protection circuit 37 is connected between a joint of the capacitors C1 and C2 and the controller circuit 26, for determining whether the lamp L is functioning normally according to the divided voltage, and outputting a protect signal to the power stage circuit 21.

In alternative embodiments, if the driving device does not have a protection function or uses an alternative protection circuit, the protection circuit 27 and the capacitor C2 of the voltage dividing circuit 23 can be omitted. That is, one end of the capacitor C1 is connected to the high terminal of the secondary winding of the transformer T, and the impedance component Z1 is connected between the other end of the capacitor C1 and ground.

Figure 2:
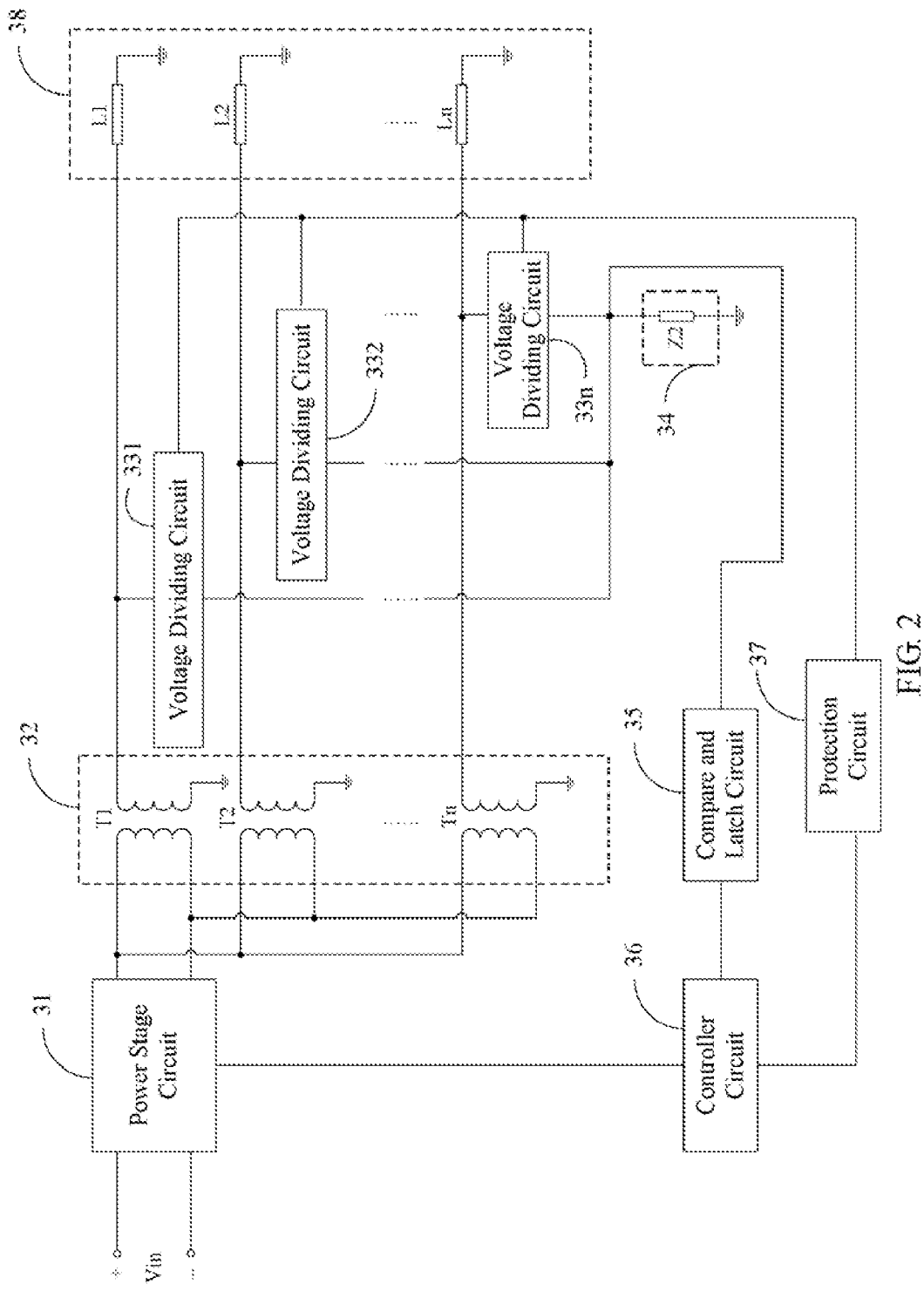
FIG. 2 is a block diagram of a driving device of another exemplary embodiment of the present invention.

FIG. 2 is a block diagram of a driving device of another exemplary embodiment of the present invention. The driving device shown in FIG. 2 is used for driving a plurality of lamps Ln (n=1, 2, 3, . . . , n), which is substantially the same as that of FIG. 1, except that the driving device of FIG. 2 includes a plurality of voltage dividing circuits $33n$ (n=1, 2, 3, . . . , n) and transformers Tn (n=1, 2, 3, . . . , n). The voltage dividing circuits $33n$ (n=1, 2, 3, . . . , n) are connected to high terminals of corresponding secondary windings of the transformers Tn (n=1, 2, 3, . . . , n). In alternative embodiments, the transformers Tn (n=1, 2, 3, . . . , n) can include a plurality of primary windings and secondary windings.

The inrush current sensing circuit 34 is connected to the voltage dividing circuits $33n$ (n=1, 2, 3, . . . , n), for sensing inrush current output from the transformers Tn (n=1, 2, 3, . . . , n). When there is arcing on one or more secondary windings of any transformers Tn (n=1, 2, 3, . . . , n), the inrush current sensing circuit 34 can sense inrush current, therefore the controller circuit 36 can shut off the output of the power stage circuit 31.

In the exemplary embodiment, structure of each of the voltage dividing circuits $33n$ (n=1, 2, 3, . . . , n) is the same as that of the voltage dividing circuit 23 (which can be omitted).

Figure 3:
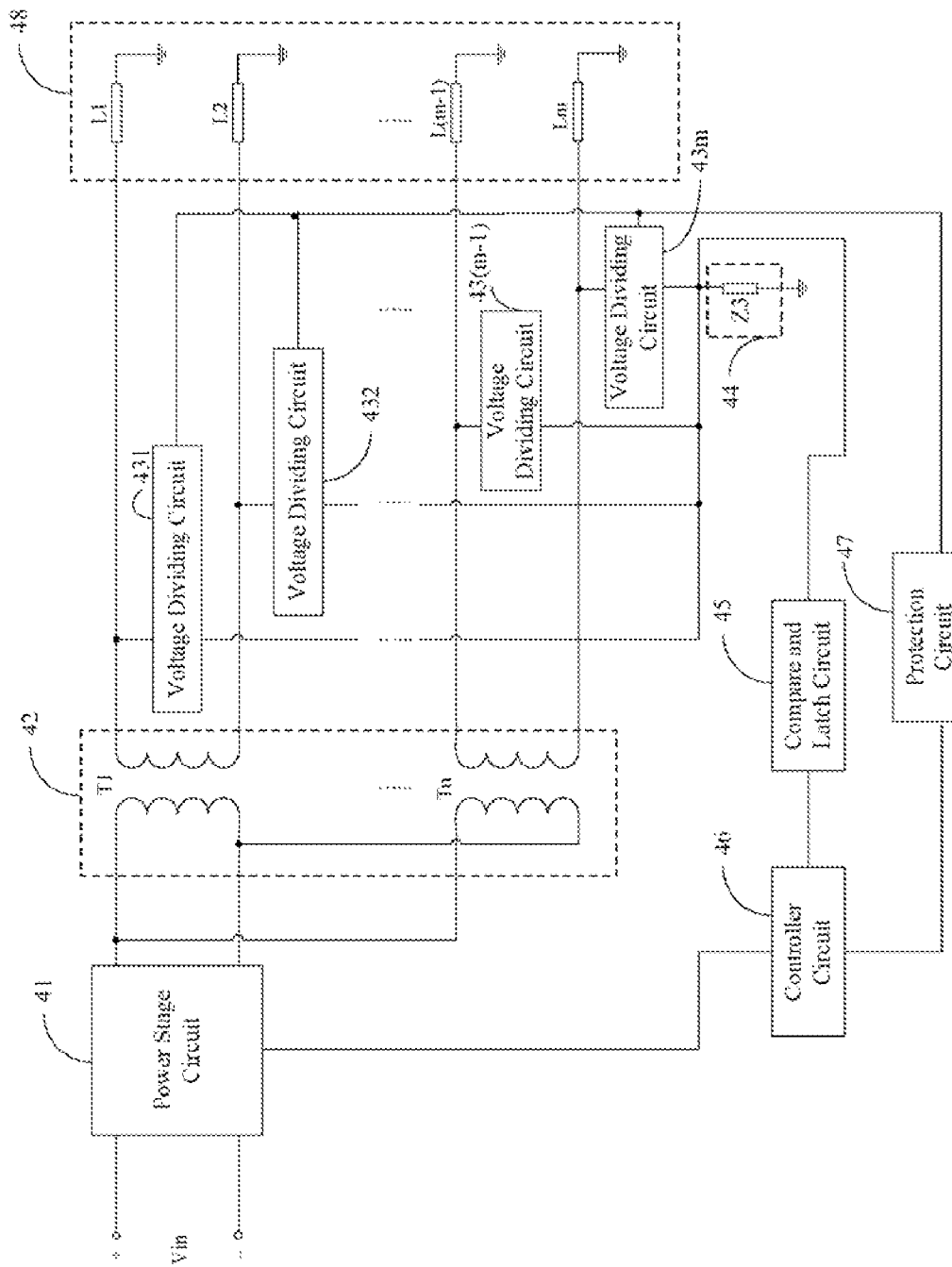
FIG. 3 is a block diagram of a driving device of yet another exemplary embodiment of the present invention.
Figure 4:
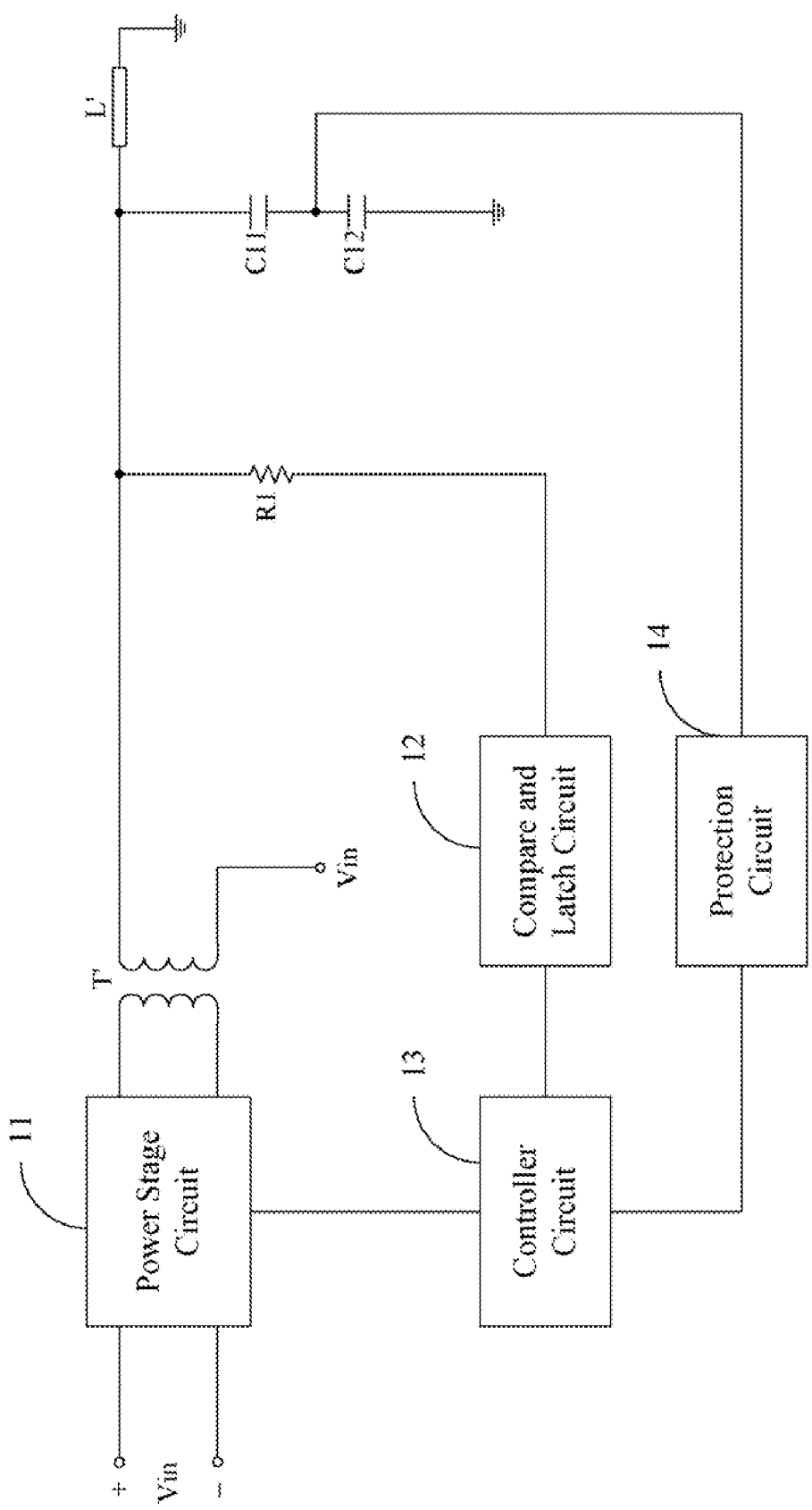
FIG. 4 is a block diagram of a conventional driving device.

FIG. 3 is a block diagram of a driving device of another exemplary embodiment of the present invention. The driving device of FIG. 3 is substantially the same as that of FIG. 2, except that the driving device of FIG. 3 includes a plurality of voltage dividing circuits $43m$ (m=1, 2, 3, . . . , 2n), and the light source module 48 includes a plurality of lamps Lm (m=1, 2, 3, . . . , 2n). High terminals of the secondary windings of the transformers Tn (n=1, 2, 3, . . . , n) are respectively connected to the plurality of lamps Lm, and corresponding ones of the plurality of voltage dividing circuits $43m$.

In the present invention, a driving device for avoiding arcing uses one impedance component to detect the arcing on one or more transformers, which lowers costs and simplifies structure of the driving device.

While embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A driving device for driving a lamp, comprising:
   power stage circuit, for converting a received direct current (DC) signal to an alternating current (AC) signal;
   a transformer circuit connected between the power stage circuit and the lamp, for converting the AC signal to an appropriate signal to drive the lamp;
   a voltage dividing circuit connected to the transformer circuit, for dividing a voltage of the signal output from the transformer circuit;
   an inrush current sensing circuit connected to the voltage dividing circuit, for sensing inrush current output from the transformer circuit; and
   a controller circuit connected to the power stage circuit, for controlling output of the power stage circuit according to output of the inrush current sensing circuit.

2. The driving device as claimed in claim 1, further comprising a compare and latch circuit, connected between the inrush current sensing circuit and the controller circuit, for outputting a latch signal according to the output from the inrush current sensing circuit.

3. The driving device as claimed in claim 2, wherein the controller circuit controls the output of the power stage circuit according to the latch signal.

4. The driving device as claimed in claim 1, wherein the transformer circuit comprises a transformer having at least one primary winding and secondary winding; wherein the primary winding of the transformer is connected to the power stage circuit, a high terminal of the secondary winding of the transformer is connected to the lamp and a low terminal of the secondary winding of the transformer is grounded.

5. The driving device as claimed in claim 4, wherein the voltage dividing circuit comprises a first voltage dividing component, and one end of the first voltage dividing component is connected to the high terminal of the secondary winding of the transformer.

6. The driving device as claimed in claim 5, wherein the inrush current sensing circuit comprises an impedance component, connected between the other end of the voltage dividing component and the ground.

7. The driving device as claimed in claim 6, wherein the voltage dividing circuit comprises a second voltage dividing component, connected between the other end of the first voltage dividing component and the impedance component.

8. The driving device as claimed in claim 6, wherein the impedance component comprises a resistor, an inductor, a series circuit comprising a resistor and an inductor, or a parallel circuit comprising a resistor and an inductor.

9. The driving device as claimed in claim 1, further comprising a protection circuit, connected between the voltage dividing circuit and the controller circuit, for outputting a protect signal according to the divided voltage.

10. A driving device for driving a plurality of lamps, comprising:
   a power stage circuit, for converting a received direct current (DC) signal to an alternating current (AC) signal;
   a plurality of transformers, wherein each of the transformers comprises at least one primary winding and one secondary winding, the primary windings are connected to the power stage circuit, and high terminals of the secondary windings respectively connected to the plurality of lamps, for converting the AC signal to appropriate signals to drive the plurality of lamps;
   a plurality of voltage dividing circuits, respectively connected to the high terminal of the secondary winding of the corresponding transformer, for dividing voltage of the signal output from the transformers;
   an inrush current sensing circuit, connected to the voltage dividing circuits, for sensing inrush current output from the transformer circuits; and
   a controller circuit connected to the power stage circuit, for controlling output of the power stage circuit according to output of the inrush current sensing circuit.

11. The driving device as claimed in claim 10, wherein low terminals of the secondary windings of the transformers are respectively connected to the plurality of lamps.

12. The driving device as claimed in claim 10, further comprising a compare and latch circuit, connected between the inrush current sensing circuit and the controller circuit, for outputting a latch signal according to the output from the inrush current sensing circuit.

13. The driving device as claimed in claim 12, wherein the controller circuit controls the output of the power stage circuit according to the latch signal.

14. The driving device as claimed in claim 10, wherein the voltage dividing circuit comprises a first voltage dividing component, and one end of the first voltage dividing component is connected to the high terminal of the secondary winding of the corresponding transformer.

15. The driving device as claimed in claim 14, wherein the inrush current sensing circuit comprises an impedance component, connected between the other end of the voltage dividing component and ground.

16. The driving device as claimed in claim 15, wherein the voltage dividing circuit comprises a second voltage dividing component, connected between the other end of the first voltage dividing component and the impedance component.

17. The driving device as claimed in claim 15, wherein the impedance component comprises a resistor, an inductor, a series circuit comprising a resistor and an inductor, or a parallel circuit comprising a resistor and an inductor.

18. The driving device as claimed in claim 10, further comprising a protection circuit, connected between the voltage dividing circuits and the controller circuit, for outputting a protect signal according to the divided voltage.

19. A driving device for driving a lamp, comprising:
   a power stage circuit for converting a received direct current (DC) signal to an alternating current (AC) signal;
   at least one transformer circuit electrically connectable between said power stage circuit and at least one corresponding lamp for converting said AC signal to an appropriate signal to drive said at least one lamp, respectively; and
   at least one voltage dividing circuit correspondingly electrically connectable with said at least one transformer circuit to divide a voltage of said converted appropriate signal output from said at least one transformer circuit for further use;
   an inrush current sensing circuit electrically connectable with each of said at least one voltage dividing circuit for sensing inrush current output from said at least one transformer circuit via said each of said at least one voltage dividing circuit, correspondingly; and
   a controller circuit electrically connectable between said inrush current sensing circuit and said power stage circuit for controlling output of said power stage circuit according to a sensed result of said inrush current sensing circuit.

20. The driving device as claimed in claim 19, wherein said each of said at least one said inrush current sensing circuit comprises an impedance component serially electrically connectable between other voltage dividing components of said each of said at least one voltage dividing circuit and ground, and said inrush current sensing circuit is electrically connectable between said impedance component and said other voltage dividing components to sense said inrush current output from said at least one transformer circuit.

* * * * *